United States Patent
Woo et al.

(10) Patent No.: US 12,272,830 B2
(45) Date of Patent: Apr. 8, 2025

(54) RECHARGEABLE BATTERY

(71) Applicant: Samsung SDI Co., Ltd., Yongin-si (KR)

(72) Inventors: Byongchul Woo, Yongin-si (KR); Wonhwa Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 658 days.

(21) Appl. No.: 17/595,238

(22) PCT Filed: Jul. 28, 2020

(86) PCT No.: PCT/KR2020/009944
§ 371 (c)(1),
(2) Date: Nov. 11, 2021

(87) PCT Pub. No.: WO2021/033941
PCT Pub. Date: Feb. 25, 2021

(65) Prior Publication Data
US 2022/0216550 A1    Jul. 7, 2022

(30) Foreign Application Priority Data
Aug. 19, 2019   (KR) ........................ 10-2019-0101314

(51) Int. Cl.
*H01M 50/164* (2021.01)
*H01M 10/04* (2006.01)
(Continued)

(52) U.S. Cl.
CPC ..... *H01M 50/164* (2021.01); *H01M 10/0431* (2013.01); *H01M 50/109* (2021.01);
(Continued)

(58) Field of Classification Search
CPC ............. H01M 50/164; H01M 50/109; H01M 50/548; H01M 50/159; H01M 50/16; H01M 50/153; H01M 10/0431
(Continued)

(56) References Cited

U.S. PATENT DOCUMENTS

| 9,496,581 B2 | 11/2016 | Pytlik et al. |
| 2003/0232241 A1 | 12/2003 | Woehrle et al. |

(Continued)

FOREIGN PATENT DOCUMENTS

| KR | 10-0360321 B1 | 1/2003 |
| KR | 10-2003-0095994 A | 12/2003 |

(Continued)

OTHER PUBLICATIONS

International Search Report for corresponding Application No. PCT/KR2020/009944 dated Nov. 11, 2020, 5pp.
(Continued)

*Primary Examiner* — James M Erwin
(74) *Attorney, Agent, or Firm* — Womble Bond Dickinson (US) LLP

(57) ABSTRACT

A rechargeable battery is disclosed. An embodiment of the present invention provides a rechargeable battery including: an electrode assembly in which a separator is provided between a first electrode and a second electrode; a case configured to have an opening at a side thereof to accommodate the electrode assembly; a cap assembly coupled to the opening to close and seal the case; a first electrode tab configured to extend from the first electrode and to be coupled to the case; and a second electrode tab configured to extend from the second electrode and to be coupled to the cap assembly, wherein the cap assembly includes a metal layer to which the second electrode tab is coupled, and a plastic layer stacked on an outer surface of the metal layer.

12 Claims, 4 Drawing Sheets

(51) Int. Cl.
  *H01M 50/109* (2021.01)
  *H01M 50/153* (2021.01)
  *H01M 50/159* (2021.01)
  *H01M 50/16* (2021.01)
  *H01M 50/548* (2021.01)

(52) U.S. Cl.
  CPC ....... *H01M 50/153* (2021.01); *H01M 50/159* (2021.01); *H01M 50/16* (2021.01); *H01M 50/548* (2021.01); *H01M 2220/30* (2013.01)

(58) Field of Classification Search
  USPC .......................................................... 429/94
  See application file for complete search history.

(56) References Cited

U.S. PATENT DOCUMENTS

| | | | | |
|---|---|---|---|---|
| 2008/0081253 | A1* | 4/2008 | Shose | H01M 50/169 429/162 |
| 2009/0011329 | A1 | 1/2009 | Yoon | |
| 2010/0239897 | A1 | 9/2010 | Sumihara et al. | |
| 2011/0076549 | A1 | 3/2011 | Kim | |
| 2013/0236757 | A1 | 9/2013 | Tikhonov et al. | |
| 2014/0199571 | A1 | 7/2014 | Ryu | |
| 2014/0315061 | A1* | 10/2014 | Wang | H01M 10/0587 429/94 |

FOREIGN PATENT DOCUMENTS

| | | |
|---|---|---|
| KR | 10-2008-0092842 A | 10/2008 |
| KR | 10-0882915 B1 | 2/2009 |
| KR | 10-2011-0035484 A | 4/2011 |
| KR | 10-2011-0045640 A | 5/2011 |
| KR | 10-2014-0093077 A | 7/2014 |
| KR | 10-1563680 B1 | 10/2015 |
| WO | WO 96/17390 A1 | 6/1996 |
| WO | WO-2020057127 A1 * | 3/2020 ........ H01M 10/0431 |

OTHER PUBLICATIONS

Office Action issued by KIPO on Feb. 5, 2025 for corresponding Korean Patent Application No. 10-2019-0101314, 7 pages.

* cited by examiner

RECHARGEABLE BATTERY

CROSS-REFERENCE TO RELATED APPLICATIONS

This application is a U.S. National Phase Patent Application of International Application Number PCT/KR2020/009944, filed on Jul. 28, 2020, which claims priority to Korean Patent Application Number 10-2019-0101314, filed on Aug. 19, 2019, the entire content of both of which is incorporated herein by reference.

TECHNICAL FIELD

The present invention relates to a rechargeable battery, and more particularly, to a very small rechargeable battery.

BACKGROUND ART

A rechargeable battery differs from a primary battery in that it can be repeatedly charged and discharged, while the latter is incapable of being recharged. Low-capacity rechargeable batteries are used in portable electronic devices such as mobile phones, laptop computers, and camcorders, and large-capacity batteries are widely used as power sources for driving a motor such as for hybrid vehicles.

Representative rechargeable batteries include a nickel-cadmium (NiCd) battery, a nickel metal hydride (NiMH) battery, a lithium (Li) battery, and a lithium ion (Li ion) rechargeable battery. In particular, lithium ion rechargeable batteries are about three times higher in operating voltage than the nickel-cadmium batteries or nickel metal hydride batteries, which are widely used as power sources for portable electronic equipment. Further, it is widely used because of its high energy density per unit weight.

In particular, in recent years, as the demand for wearable devices such as headphones, earphones, smartwatches, and body-attached medical devices using Bluetooth increases, the need for ultra-small rechargeable batteries with high energy density is increasing.

It is an important task to secure required electrical capacity within a limited size, and to effectively reduce a weight and improve structural stability of such a miniature rechargeable battery.

The above information disclosed in this Background section is only for enhancement of understanding of the background of the invention, and therefore, it may contain information that does not form the prior art that is already known in this country to a person of ordinary skill in the art.

DISCLOSURE

An embodiment of the present invention has been made in an effort to provide a rechargeable battery capable of effectively reducing weight, improving electrical capacity, and efficiently securing structural stability.

An embodiment of the present invention provides a rechargeable battery including: an electrode assembly in which a separator is provided between a first electrode and a second electrode; a case configured to have an opening at a side thereof to accommodate the electrode assembly; a cap assembly coupled to the opening to close and seal the case; a first electrode tab configured to extend from the first electrode and to be coupled to the case; and a second electrode tab configured to extend from the second electrode and to be coupled to the cap assembly, wherein the cap assembly includes a metal layer to which the second electrode tab is coupled and a plastic layer stacked on an outer surface of the metal layer.

The cap assembly may include a stack portion in which the plastic layer is stacked on an outer surface of the metal layer, and a terminal portion in which the outer surface of the metal layer is exposed to the outside.

The first electrode, the second electrode, and the separator may be wound around a center pin, an upper surface may face the cap assembly, and a lower surface may face the bottom of the case in the electrode assembly; the first electrode tab may extend from the lower surface of the electrode assembly to be coupled to a bottom of the case; and the second electrode tab may extend from the upper surface of the electrode assembly to be coupled to metal layer of the cap assembly.

It may further include an insulating member configured to surround the electrode assembly between the electrode assembly and the case and to insulate the electrode assembly from the case.

An upper end of the center pin may protrude from the upper surface of the electrode assembly toward the cap assembly, and the second electrode tab may be supported on the upper end of the center pin to be welded to the metal layer of the cap assembly.

The terminal portion may be formed at a central side corresponding to the center pin in the cap assembly.

A side surface of the metal layer may be surrounded by the plastic layer.

The plastic layer may extend outside a circumference of the metal layer to form a first fusion portion, and the first fusion portion may be fused to the case in the cap assembly.

The case may include a second fusion portion of a plastic material surrounding an upper end of a sidewall surrounding the opening, and the first fusion portion may be fused to the second fusion portion.

The second fusion portion may be positioned on an upper surface and an outer surface of the sidewall except for an inner surface facing the electrode assembly from the upper end thereof.

The cap assembly may have an annular stepped groove extending from the first fusion portion, and the second fusion portion may be seated in the stepped groove, and may be fused with the first fusion portion.

The rechargeable battery may have a coin shape with a diameter-to-height ratio of 1 or more.

According to the embodiment of the present invention, it is possible to provide a rechargeable battery capable of effectively reducing weight, improving electrical capacity, and efficiently securing structural stability.

MODE FOR INVENTION

Figure 1:
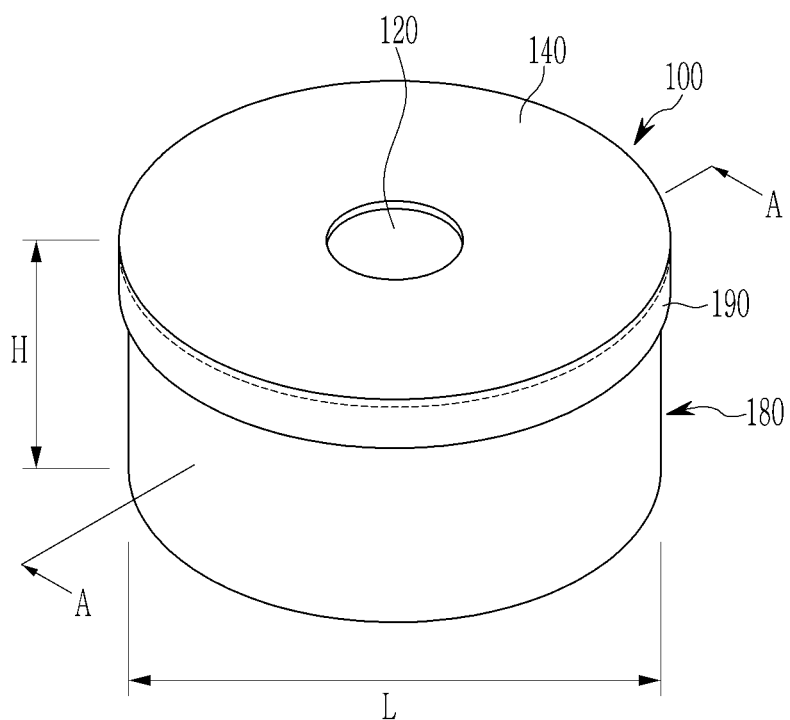
FIG. 1 illustrates a perspective view of a rechargeable battery according to an embodiment of the present invention.

In the following detailed description, only certain embodiments of the present invention have been shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In this specification, redundant descriptions for the same constituent elements will be omitted.

In this specification, it is to be understood that when one component is referred to as being "connected" or "coupled" to another component, it may be connected or coupled directly to the other component or may be connected or coupled to the other component with a further component intervening therebetween. In this specification, it is to be understood that when one component is referred to as being "connected" or "coupled directly" to another component, it may be connected to or coupled to the other component without being connected to a component intervening therebetween.

It is also to be understood that the terminology used herein is only for the purpose of describing particular embodiments, and is not intended to be limiting of the invention.

Singular forms are to include plural forms unless the context clearly indicates otherwise.

It will be further understood that terms "comprises" or "have" used in the present specification specifies the presence of stated features, numerals, steps, operations, components, parts, or a combination thereof, but do not preclude the presence or addition of one or more other features, numerals, steps, operations, components, parts, or a combination thereof.

In addition, as used herein, the term "and/or" includes any plurality of combinations of items or any of a plurality of listed items. In this specification, "A or B" may include "A", "B", or "A and B".

An embodiment of the present invention relates to a secondary battery, and although a size thereof may vary, it may be an ultra-small rechargeable battery with a very small size such that it can be used in headphones, earphones, smartwatches, wearable devices, etc.

In addition, the embodiment of the present invention may be applied to various forms and types of rechargeable batteries such as a prismatic, a cylindrical, and a fin type, but may preferably be a coin type or button type of battery. The coin type or button type of battery has a same shape as a thin coin or button, may be used as an ultra-small battery, and may be defined as a battery in which a ratio of a height H to a diameter L of the rechargeable battery (height/diameter) is 1 or less.

The coin-type or button-type of battery may have a cylindrical shape having a circular cross-sectional shape, but the present invention is not limited thereto, and may have an oval or polygonal cross-sectional shape.

Figure 2:
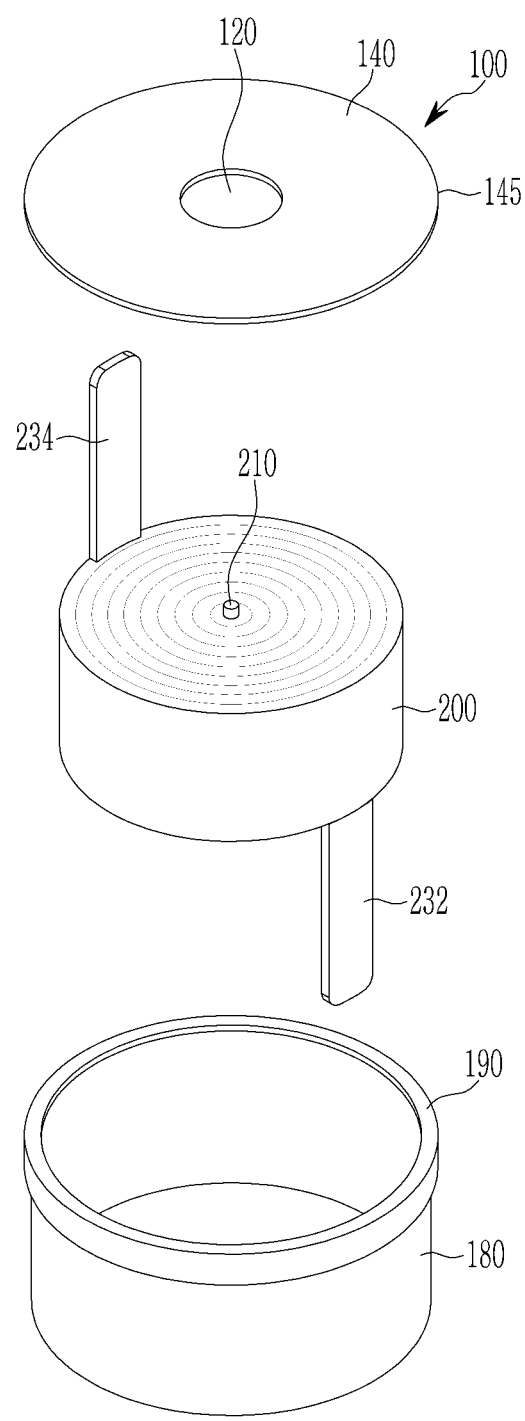
FIG. 2 illustrates a schematic perspective view of the rechargeable battery of FIG. 1.

Herein, as illustrated in FIG. 2, the diameter L indicates a maximum distance between sides of a case 180 in which an electrode assembly 200 is built, the height H indicates a minimum distance from a flat bottom surface of a cell to a flat top surface of the cell, and it may be understood as from a lower surface of the case 180 to an upper surface of a cap assembly 100.

The rechargeable battery according to an embodiment of the present invention may have various sizes, types, and shapes, but hereinafter, for convenience of description of an embodiment of the present invention, a coin-type battery having a circular cross-sectional shape will be described as an example.

FIG. 1 illustrates a perspective view of a rechargeable battery according to an embodiment of the present invention, and FIG. 2 illustrates a schematic perspective view of the rechargeable battery of FIG. 1. Meanwhile, FIG. 3 illustrates a cross-sectional view taken along a line A-A of the rechargeable battery of FIG. 1.

The rechargeable battery according to an embodiment of the present invention includes: the electrode assembly 200 in which a separator 13 is positioned between a first electrode 11 and a second electrode 12; the case 180 having an opening at a side thereof, the cap assembly 100 coupled to the opening to seal the case 180; a first electrode tab 232 extending from the first electrode 11 and coupled to the case 180; and a second electrode tab 234 extending from the second electrode 12 and coupled to the cap assembly 100, and the cap assembly 100 includes a metal layer 120 to which the second electrode tab 234 is coupled and a plastic layer 140 stacked on an outer surface of the metal layer 120.

The electrode assembly 200 includes a first electrode 11 and a second electrode 12 each of which may have a coated region and an uncoated region. The first electrode 11 may serve as a positive electrode, and the second electrode 12 may serve as a negative electrode, or vice versa. The separator 13 for electrical insulation may be positioned between the first electrode 11 and the second electrode 12.

Figure 3:
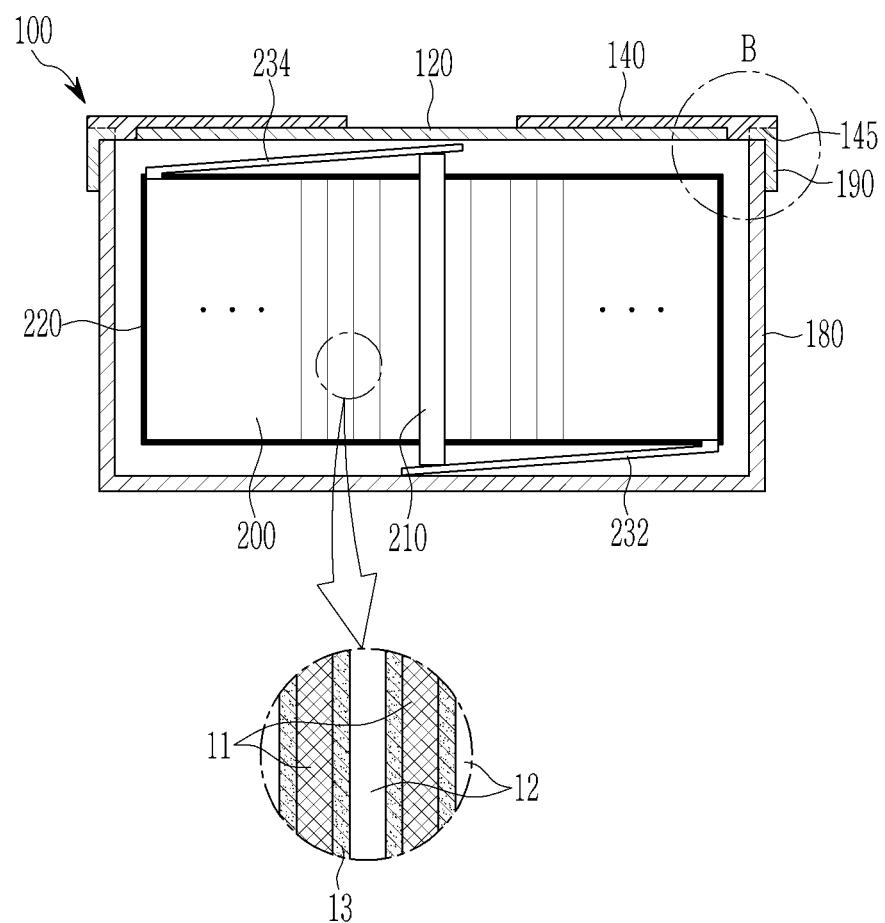
FIG. 3 illustrates a cross-sectional view taken along a line A-A of the rechargeable battery illustrated in FIG. 1.

In an embodiment of the present invention, the electrode assembly 200 may be provided as a stacked type, but as illustrated in FIG. 2 and FIG. 3, may have a jelly-roll form in which the first electrode 11, the second electrode 12, and the separator 13 are wound together around a center pin 210.

When the electrode assembly 200 corresponds to a winding type, as illustrated in FIG. 2 and FIG. 3, the electrode assembly 200 may have a flat upper surface and lower surface, and may have a curved side surface, and a winding axis may be parallel to a height direction of the rechargeable battery. That is, the electrode assembly 200 may have an upper surface facing the cap assembly 100 and a lower surface facing a bottom of the case 180.

The first electrode 11 is formed to have a long band shape, and includes a negative coating region, which is a region where a negative active material layer is coated to a current collector of a metal foil (e.g., a Cu foil), and a negative uncoated region, which is a region where no active material is coated. The negative uncoated region may be positioned at a first end portion of the negative electrode in a longitudinal direction thereof.

The second electrode 12 is formed to have a long band shape, and includes a positive coating region, which is a region where a positive active material layer is coated to a current collector of a metal foil (e.g., an Al foil), and a positive uncoated region, which is a region where no active material is coated. The positive uncoated region may be positioned at a first end portion of the positive electrode in a longitudinal direction thereof.

The case 180 has an accommodation space in which the electrode assembly 200 is accommodated, and an opening may be formed at a first side thereof. In an embodiment of the present invention, the case 180 has an opening formed on an upper surface thereof as illustrated in FIG. 1 to FIG. 3, and the electrode assembly 200 may be accommodated therein. The opening may be formed on the side or the bottom unlike FIG. 1 to FIG. 3, but for the purpose of description of the present invention, the following will be described based on the opening formed on the upper surface of the case 180.

The case 180 may be made of an electrically conductive metal material such as aluminum or stainless steel, and a shape of the case 180 may be various as needed, such as a cylindrical shape or a square shape, but as an embodiment of the present invention, a cylindrical case 180 in which the wound electrode assembly 200 is accommodated is illustrated in FIG. 1 and FIG. 2.

The cap assembly 100 may be coupled to the opening of the case 180, and may seal the accommodation space of the case 180. A coupling method with the case 180 may be various methods such as metal-to-metal welding, plastic welding, coupling using tape or an adhesive, and the like.

The first electrode tab 232 may extend from the first electrode 11 of the electrode assembly 200 to be coupled to the case 180. The first electrode tab 232 may be integrally provided with the first electrode 11 or may be separately manufactured and coupled to the first electrode 11 by welding or the like.

The first electrode tab 232 may be made of a metal material with electrical conductivity, and is electrically connected to the first electrode 11 to have the same polarity. In addition, the case 180 coupled to the first electrode tab 232 to be electrically connected thereto may have the same polarity as that of the first electrode 11.

The first electrode tab 232 and the case 180 may have a mutual coupling relationship using a separate medium, or may be directly coupled to each other by welding or the like as illustrated in FIG. 2.

The second electrode tab 234 may extend from the second electrode 12 of the electrode assembly 200 to be coupled to the cap assembly 100. The second electrode tab 234 may be integrally provided with the second electrode 12 or may be separately manufactured and coupled to the second electrode 12 by welding or the like.

The second electrode tab 234 may be made of a metal material with electrical conductivity, and is electrically connected to the second electrode 12 to have the same polarity. In addition, the cap assembly 100 coupled to the second electrode tab 234 to be electrically connected thereto may have the same polarity as that of the second electrode 12. The second electrode tab 234 and the cap assembly 100 may have a mutual coupling relationship using a separate medium, or may be directly coupled to each other by welding or the like as illustrated in FIG. 2.

Meanwhile, referring to FIG. 3, the first electrode tab 232 and the second electrode tab 234 may extend from the outside of the insulating member 220 to contact the case 180, and may be used in a form in which an outer surface is coated with an electrically insulating material for electrical insulation from the case 180.

Meanwhile, the cap assembly 100 includes a metal layer 120 and a plastic layer 140. The metal layer 120 may be made of a plate made of a metal material, and the second electrode tab 234 may have the same polarity as that of the second electrode 12 by being coupled thereto by welding or the like.

The plastic layer 140 may have a stacked structure on an outer surface of the metal layer 120 by injection molding or a bonding method using an adhesive, and has electrical insulation.

According to an embodiment of the present invention, the cap assembly 100 may be manufactured to include the plastic layer 140, thereby reducing a weight thereof compared to a case where the cap assembly 100 is entirely made of a metal material, and furthermore, as the plastic layer 140 and the metal layer 120 are provided together, it is possible to secure structural stability such as improving rigidity.

Meanwhile, according to an embodiment of the present invention, as shown in FIG. 1 to FIG. 3, the cap assembly 100 may have a stack portion in which the plastic layer 140 is stacked on an outer surface of the metal layer 120, and a terminal portion in which the outer surface of the metal layer 120 is exposed to the outside.

In FIG. 1, a portion on which the plastic layer 140 is stacked corresponds to the stack portion, a portion where the metal layer 120 is exposed at a central side corresponds to the terminal portion, and in FIG. 2, the stack portion and the terminal portion are illustrated in a same manner as well.

In an embodiment of the present invention, the metal layer 120 of the cap assembly 100 is connected to the second electrode tab 234 to have same polarity as that of the second electrode 12, and the plastic layer 140 forms a terminal portion exposing some of the metal layer 120 to the outside so that it can be connected to an external electronic device or the like while limiting unnecessary electrical connection by forming a stack portion covering the outer surface of the metal layer 120.

In FIG. 1 to FIG. 3, it is illustrated that a stack portion in which the plastic layer 140 is stacked is formed on the outer surface of the metal layer 120 in an area of the cap assembly 100 except for a central side, and a terminal portion in which the outer surface of the metal layer 120 is directly exposed to the outside is formed at the central side without the plastic layer 140 according to an embodiment of the present invention. However, a position or shape of the terminal portion may be set in various ways as needed.

According to an embodiment of the present invention, it is possible to form a stack portion including the plastic layer 140 in the cap assembly 100, to effectively achieve overall weight reduction, and at the same time to eliminate unnecessary electrical connection in the stack portion.

Further, in an embodiment of the present invention, it is possible to effectively implement the terminal portion while omitting a separate configuration by simply and effectively implementing the terminal portion by removing only the plastic layer 140 from the cap assembly 100.

In the meantime, in an embodiment of the present invention, in the electrode assembly 200, the first electrode 11, the second electrode 12, and the separator 13 may be wound around a center pin 210, an upper surface thereof may face the cap assembly 100, and a lower surface thereof may face bottom of the case 180; the first electrode tab 232 may extend from a lower surface of the electrode assembly 200 to be coupled to the bottom of the case 180; and the second electrode tab 234 may extend from an upper surface of the electrode assembly 200 to be coupled to the metal layer 120 of the cap assembly 100.

In FIG. 2 and FIG. 3, according to an embodiment of the present invention, the wound electrode assembly 200 in which the first electrode 11, the second electrode 12, and the separator 13 are wound around the center pin 210 corresponding to a winding axis is illustrated. Referring to FIG. 2, the upper surface of the electrode assembly 200 may face the cap assembly 100, and the lower surface of the electrode assembly 200 may face the bottom of the case 180.

As such, it is possible to effectively utilize an accommodation space of the case 180 to improve energy density by using the wound electrode assembly 200 in a state in which the center pin 210 vertically extends, and furthermore, it may be effective in realizing a flat rechargeable battery such as a coin-type battery.

Meanwhile, the first electrode tab 232 may extend from the lower surface of the electrode assembly 200 as illustrated in FIG. 3, and thus may extend along a simple and efficient path to be coupled to the bottom of the case 180.

In addition, the second electrode tab 234 may extend from the upper surface of the electrode assembly 200 as illustrated in FIG. 3, and thus may be coupled to the cap assembly 100 by reducing a distance from the cap assembly 100 and extending along a simple and efficient path.

Meanwhile, as illustrated in FIG. 3, according to an embodiment of the present invention, it may further include an insulating member 220 that wraps the electrode assembly 200 between the electrode assembly 200 and the case 180, and insulates the electrode assembly 200 from the case 180.

The insulating member 220 may surround the electrode assembly 200, and may electrically insulate the electrode assembly 200 in relation to the case 180 and the cap assembly 100. The insulating member 220 may be made of an electrically insulating material such as a polymer, and may be provided in the form of a film to surround the electrode assembly 200, or may be provided as a liquid and applied to the outer surface of the electrode assembly 200 and then undergo a curing process etc.

Meanwhile, according to an embodiment of the present invention, an upper end of the center pin 210 may protrude from the upper surface of the electrode assembly 200 toward the cap assembly 100, and the second electrode tab 234 may be supported on the upper end of the center pin 210 to be welded to the metal layer 120 of the cap assembly 100.

In an embodiment of the present invention, the electrode assembly 200 may include the center pin 210 in a center thereof, and the center pin 210 may be made of various materials having electrical insulation.

The center pin 210 may protrude toward the cap assembly 100 with an upper end thereof facing the cap assembly 100 rather than the upper surface of the electrode assembly 200. The second electrode tab 234 may be in contact with the metal layer 120 of the cap assembly 100 by having a coupling portion thereof with the cap assembly supported on the upper end of the center pin 210.

Accordingly, the second electrode tab 234 to be welded with the metal layer 120 of the cap assembly 100 may be stably maintained in contact with the metal layer 120, and thus the second electrode tab 234 may be effectively coupled to the cap assembly 100 through external laser welding, etc. before and after coupling between the case 180 and the cap assembly 100.

Meanwhile, in an embodiment of the present invention, the cap assembly 100 may be formed with the terminal portion on a central side corresponding to the center pin 210. FIG. 1 to FIG. 3 illustrate the cap assembly 100 in which the terminal portion is formed at the central side thereof according to an embodiment of the present invention.

In the cap assembly 100, the terminal portion corresponds to an area where the plastic layer 140 is not stacked, and even when the cap assembly 100 in which the plastic layer 140 is coupled to the metal layer 120 by injection molding or the like is directly coupled to the case 180, the second electrode tab 234 may be positioned under the terminal portion where the metal layer 120 is exposed, and thus even when the plastic layer 140 uses the pre-stacked cap structure and precedes the coupling between the case 180 and the cap assembly 100, it is advantageous because the second electrode tab 234 and the metal layer 120 may be welded to each other by a laser method or the like through the exposed outer surface of the terminal portion.

Meanwhile, in an embodiment of the present invention, a side surface of the metal layer 120 may be surrounded by the plastic layer 140. That is, in the cap assembly 100, a plate made of a metal material constituting the metal layer 120 may be coupled to the plastic layer 140 on a side surface thereof as well as an upper surface thereof.

Figure 4:
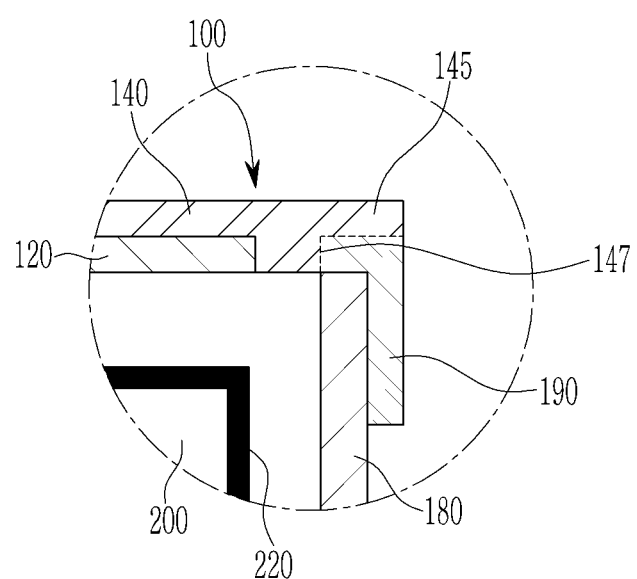
FIG. 4 illustrates an enlarged view of an area B of FIG. 3.

FIG. 3 illustrates the plastic layer 140 surrounding the side surface of the metal layer 120 according to an embodiment of the present invention, and FIG. 4, which illustrates an enlarged area B of FIG. 3, shows the plastic layer 140 at a side of the metal layer 120.

A surface of the metal layer 120 in contact with the plastic layer 140 may be etched by a laser or chemical method to improve bonding strength with the plastic layer 140, and etching may be performed on the upper surface as well as the side surface of the metal layer 120 according to an embodiment of the present invention.

That is, according to an embodiment of the present invention, the plate constituting the metal layer 120 is coupled to the plastic layer 140 on the upper surface as well as on the side, thereby effectively improving a mutual bonding force.

Meanwhile, in the cap assembly 100, the plastic layer 140 may extend outside a circumference of the metal layer 120 to form a first fusion portion 145, and the first fusion portion 145 may be fused to the case 180.

Referring to FIG. 3 and FIG. 4, in the cap structure, an outer diameter of the plastic layer 140 is set to be larger than that of the metal layer 120, and a portion of the plastic layer 140 that extends outside the circumference of the metal layer 120 corresponds to the first fusion portion 145.

The first fusion portion 145 may be thermally fused to the case 180 while being melted by using a laser or the like. In the case 180, the bonding force with the first fusion portion 145 may be improved by etching a surface of the case 180 to be bonded to plastic using a laser or a chemical agent.

According to an embodiment of the present invention, mutual coupling is effectively achieved while having an efficient electrical insulation structure between the cap structure and the case 180, by forming the first fusion portion 145 made of only the plastic layer 140 by removing the metal layer 120 in an edge region of the cap structure.

Meanwhile, in an embodiment of the present invention, the case 180 may include a second fusion portion 190 of a plastic material surrounding an upper end of a side wall surrounding the opening, and the first fusion part 145 may be fused to the second fusion portion 190.

In FIG. 3 and FIG. 4, the case 180 having the second fusion portion 190 is illustrated, and an interface between the first fusion portion 145 and the second fusion portion 190 is represented by a dotted line to help understanding.

Referring to FIG. 3 and FIG. 4, the upper surface of the case 180 may correspond to the opening, and the second fusion portion 190 made of plastic may be provided at at least an upper end of a sidewall surrounding the opening. The second fusion portion 190 may be coupled to an upper end of the sidewall of the case 180 by injection molding or the like.

Etching may be formed on a metal surface of the case 180 on which the second fusion portion 190 is formed using a laser or a chemical agent, and the second fusion portion 190 may be coupled to the case 180 by injection molding or the like.

Meanwhile, the first fusion portion 145 of the cap assembly 100 may be thermally fused to the second fusion portion 190 of the case 180 to be coupled to each other. When the first fusion portion 145 and the second fusion portion 190 are fused, an interface therebetween may disappear, but in FIG. 3 and FIG. 4, the interface between the first fusion portion 145 and the second fusion portion 190 is indicated by a dotted line for better understanding.

According to an embodiment of the present invention, plastic welding between the cap assembly 100 and the case 180 may be effectively performed by forming the second fusion portion 190 in a portion of the case 180 coupled to the plastic layer 140 of the cap assembly 100.

Meanwhile, as illustrated in FIG. 3 and FIG. 4, the second fusion portion 190 may be positioned on an upper surface and an outer surface of the sidewall except for an inner surface facing the electrode assembly 200 from an upper side thereof.

Forming the second fusion portion 190 on the inner surface of the sidewall of the case 180 is the same as reducing a diameter of the opening of the case 180 in the end, and movement of the electrode assembly 200 embedded through the opening may be prevented or a size of the electrode assembly 200 may be limited.

Therefore, according to an embodiment of the present invention, the second fusion portion 190 is formed on the upper surface and the outer surface of the case 180 except for the inner surface from the side surface thereof, but the present invention is not limited thereto, and the second fusion portion 190 may be formed in various areas as needed.

The cap assembly 100 may have an annular stepped groove 147 extending on the first fusion portion 145, and the second fusion portion 190 may be seated in the stepped groove 147 and fused with the first fusion portion 145.

Referring to FIG. 4, in the cap assembly 100, the stepped groove 147 indicated by a dotted line may be formed in the first fusion portion 145. The stepped groove 147 may be provided to correspond to a shape of the second fusion portion 190 so that the second fusion part 190 may stably contact the first fusion portion 145 when the cap assembly 100 is seated on the case 180.

FIG. 4 illustrates the annular first fusion portion 145 extending along an edge of the cap assembly 100 according to an embodiment of the present invention, and referring to FIG. 3, the stepped groove 147 may be provided to extend along the first fusion portion 145 and to have an annular shape that is recessed inward from a lower portion of the first fusion portion 145.

Meanwhile, the rechargeable battery according to an embodiment of the present invention may have a coin shape with a ratio of a diameter L to a height H of 1 or more.

That is, according to the present invention, the coin-type battery may be understood as a flat and thin battery having the ratio of the diameter L to the height H of 1 or more, and may be advantageous in realizing an ultra-small size.

That is, an embodiment of the present invention may be applied to a very small coin-type battery. Accordingly, it is possible to reduce the weight by using the plastic layer 140 in a space that is limited to a small size, while at the same time, it is possible to effectively secure an accommodation space for the case 180, and it is possible to form the terminal portion while effectively reducing the components.

While the present invention has been particularly shown and described with reference to specific embodiments thereof, it will be understood by those skilled in the art that various changes in form and detail may be made therein without departing from the spirit and scope of the invention as defined by the following claims.

<Description of Symbols>

100: cap assembly
120: metal layer
140: plastic layer
145: first fusion portion
147: step groove
180: case
190: second fusion portion
200: electrode assembly
210: center pin
220: insulating member
232: first electrode tab
234: second electrode tab

The invention claimed is:

1. A rechargeable battery comprising:
an electrode assembly in which a separator is between a first electrode and a second electrode;
a case having an opening at a side thereof to accommodate the electrode assembly;
a cap assembly coupled to the opening to close and seal the case;
a first electrode tab extending from the first electrode and coupled to the case; and
a second electrode tab extending from the second electrode and coupled to the cap assembly,
wherein the cap assembly comprises
a metal layer to which the second electrode tab is coupled, and
a plastic layer on an outer surface of the metal layer, and
wherein an entirety of the metal layer has a plate shape.

2. The rechargeable battery of claim 1, wherein
the cap assembly includes a stack portion in which the plastic layer is stacked on the outer surface of the metal layer, and a terminal portion in which the outer surface of the metal layer is exposed to the outside.

3. A rechargeable battery comprising:
an electrode assembly in which a separator is between a first electrode and a second electrode;
a case having an opening at a side thereof to accommodate the electrode assembly;
a cap assembly coupled to the opening to close and seal the case;
a first electrode tab extending from the first electrode and coupled to the case; and
a second electrode tab extending from the second electrode and coupled to the cap assembly,
wherein the cap assembly comprises
a metal layer to which the second electrode tab is coupled, and
a plastic layer on an outer surface of the metal layer,
wherein:
the first electrode, the second electrode, and the separator are wound around a center pin, an upper surface of the electrode assembly faces the cap assembly, and a lower surface of the electrode assembly faces a bottom of the case;
the first electrode tab extends from the lower surface of the electrode assembly to be coupled to a bottom of the case; and
the second electrode tab extends from the upper surface of the electrode assembly to be coupled to the metal layer of the cap assembly.

4. The rechargeable battery of claim 1, further comprising
an insulating member configured to surround the electrode assembly between the electrode assembly and the case and to insulate the electrode assembly from the case.

5. The rechargeable battery of claim 3, wherein
an upper end of the center pin protrudes from the upper surface of the electrode assembly toward the cap assembly, and
the second electrode tab is supported on the upper end of the center pin to be welded to the metal layer of the cap assembly.

6. The rechargeable battery of claim 5, wherein
the cap assembly includes a terminal portion at which the outer surface of the metal layer is exposed to the outside, and the terminal portion is formed at a central side corresponding to the center pin in the cap assembly.

7. The rechargeable battery of claim 1, wherein
a side surface of the metal layer is surrounded by the plastic layer.

8. The rechargeable battery of claim 1, wherein
the plastic layer extends outside a circumference of the metal layer to form a first fusion portion, and the first fusion portion is fused to the case in the cap assembly.

9. A rechargeable battery comprising:
an electrode assembly in which a separator is between a first electrode and a second electrode;
a case having an opening at a side thereof to accommodate the electrode assembly:
a cap assembly coupled to the opening to close and seal the case;
a first electrode tab extending from the first electrode and coupled to the case; and
a second electrode tab extending from the second electrode and coupled to the cap assembly,
wherein the cap assembly comprises
a metal layer to which the second electrode tab is coupled, and
a plastic layer on an outer surface of the metal layer, wherein
the plastic layer extends outside a circumference of the metal layer to form a first fusion portion, and the first fusion portion is fused to the case in the cap assembly,
the case includes a second fusion portion of a plastic material surrounding an upper end of a sidewall surrounding the opening, and
the first fusion portion is fused to the second fusion portion.

10. The rechargeable battery of claim 9, wherein
the second fusion portion is positioned on an upper surface and an outer surface of the sidewall except for an inner surface facing the electrode assembly from the upper end thereof.

11. The rechargeable battery of claim 9, wherein
the cap assembly has an annular stepped groove extending from the first fusion portion, and
the second fusion portion is seated in the stepped groove and is fused with the first fusion portion.

12. The rechargeable battery according to claim 1, wherein
the rechargeable battery has a coin shape with a diameter-to-height ratio of 1 or more.

* * * * *